Sept. 22, 1964 H. TALV 3,150,026
APPARATUS FOR PLACING AND BONDING WEFT STRANDS
TO CONTINUOUS WARP STRANDS
Filed April 22, 1960 4 Sheets-Sheet 1

Harry Talv
*INVENTOR.*

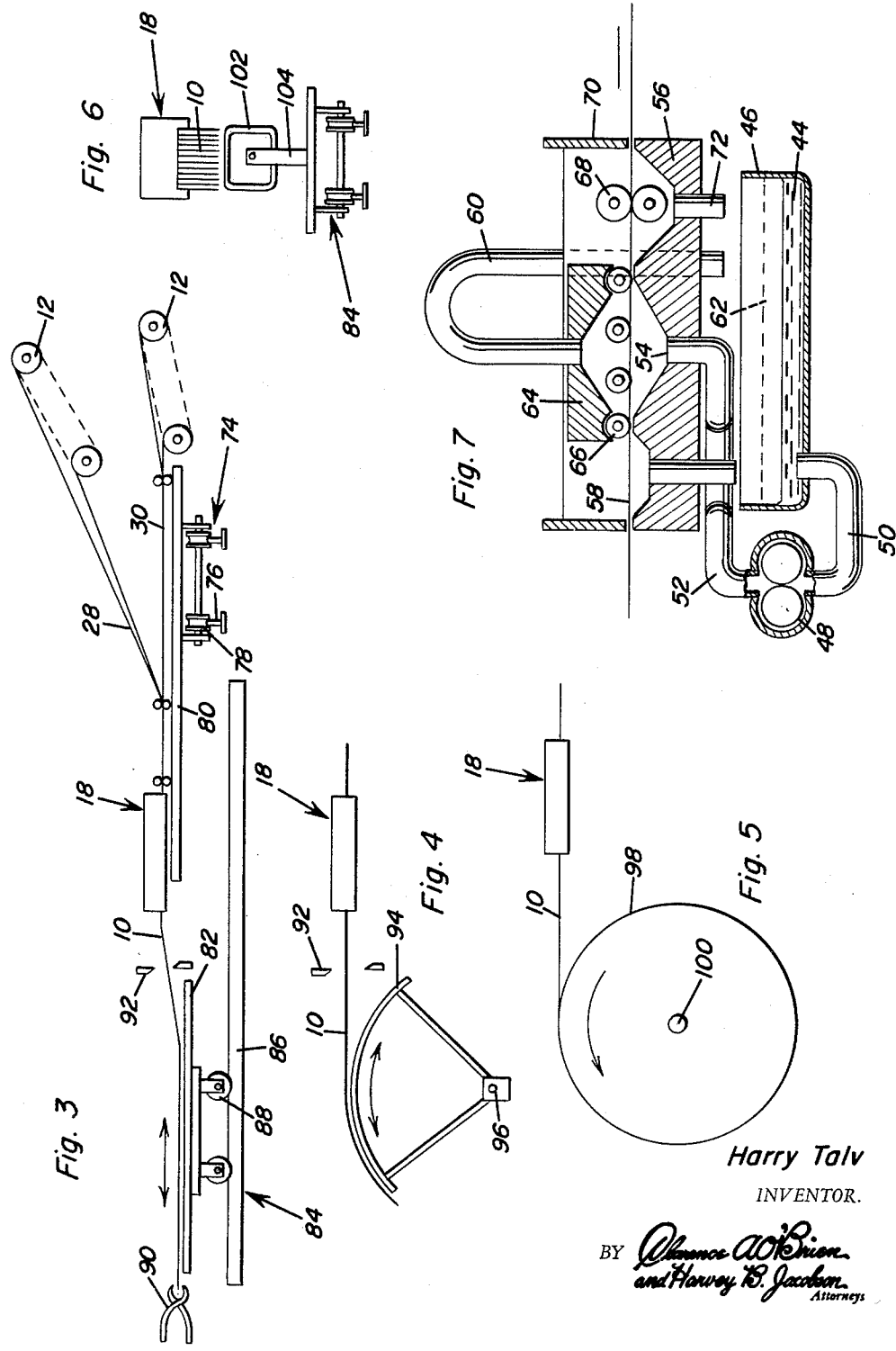

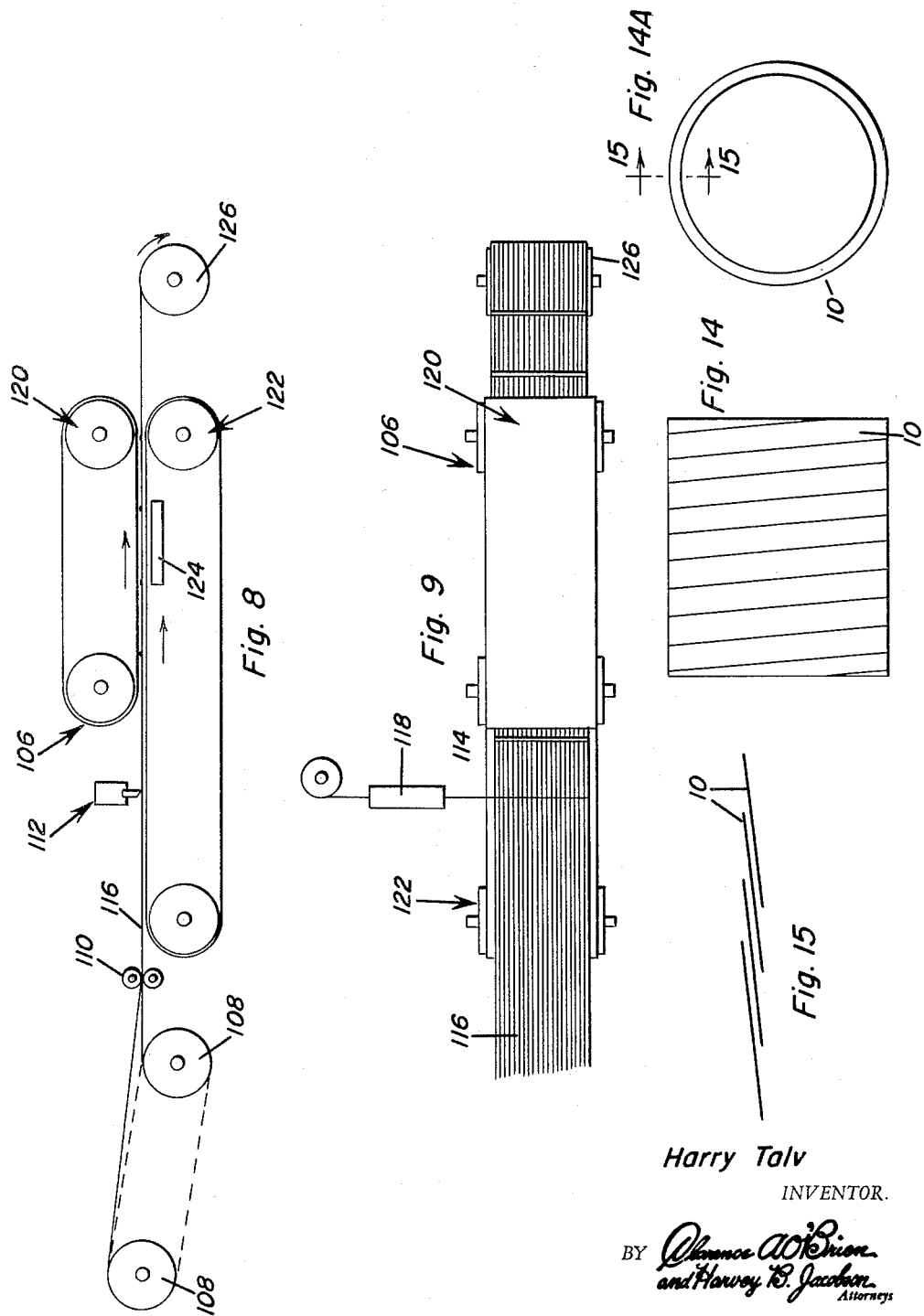

Sept. 22, 1964  H. TALV  3,150,026
APPARATUS FOR PLACING AND BONDING WEFT STRANDS
TO CONTINUOUS WARP STRANDS
Filed April 22, 1960  4 Sheets-Sheet 4
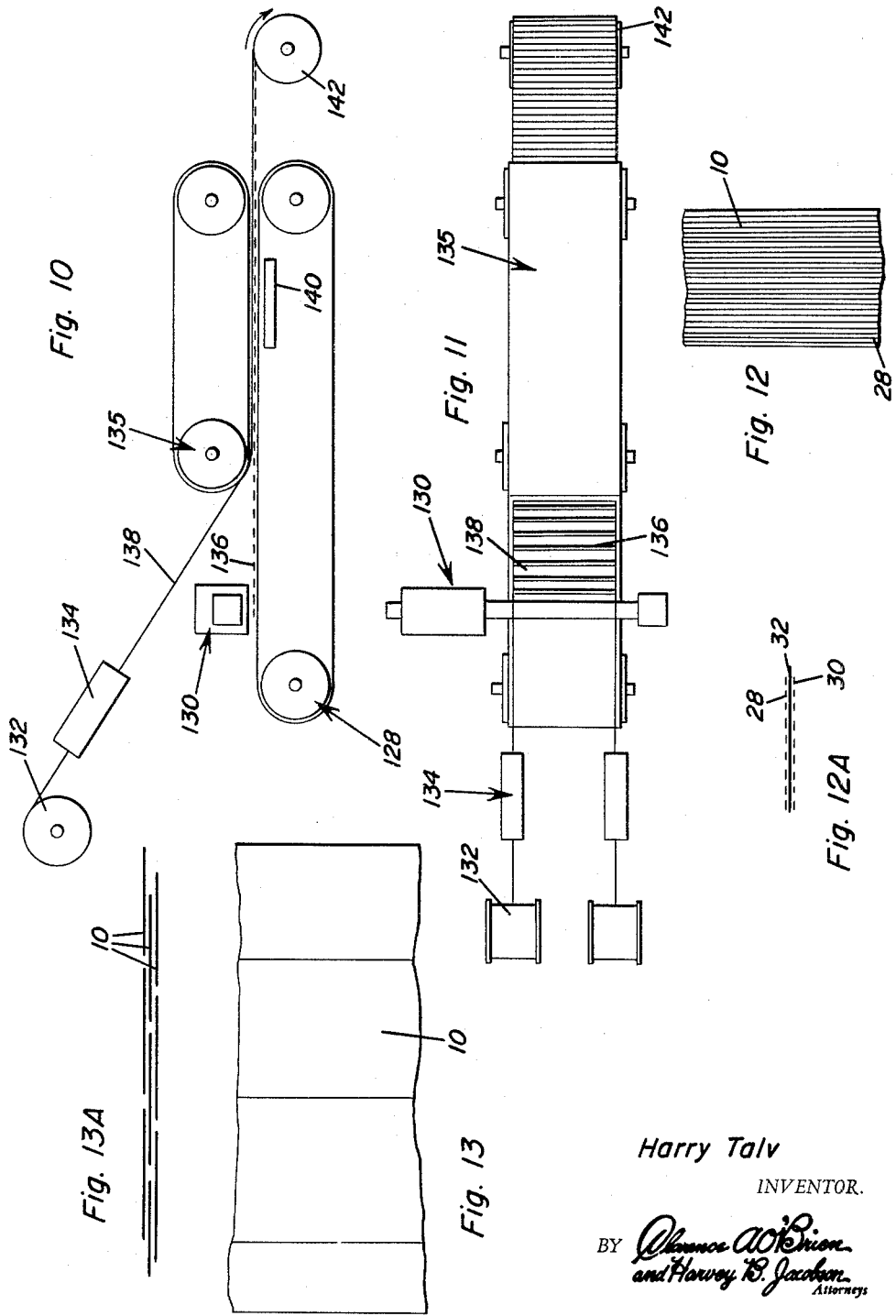
Harry Talv
INVENTOR.

United States Patent Office 3,150,026
Patented Sept. 22, 1964

3,150,026
APPARATUS FOR PLACING AND BONDING WEFT STRANDS TO CONTINUOUS WARP STRANDS
Harry Talv, Heavener, Okla., assignor to Ferro Corporation, Cleveland, Ohio, a corporation of Ohio
Filed Apr. 22, 1960, Ser. No. 24,005
6 Claims. (Cl. 156—441)

The present invention generally relates to a plastic laminate of the type reinforced by fiber glass and more particularly to a method and apparatus for producing such a plastic laminate from continuous straight strands of fiber.

The primary object of the present invention is to provide a method and apparatus to form straight strands of saturated fiber into a laminate of desired thickness and physical properties depending upon the particular requirements of the use of the laminate. For example, if the laminate is to be subjected to more stress in any one direction, a greater quantity of fibers can be arranged in that direction for increasing the strength of the laminate in the direction in which the greatest stress is applied to the laminate. An example of the advantages of this feature will readily be apparent in the construction of walls for large storage tanks where the stresses are primarily in the nature of a tension in circumference. In this arrangement, the reinforcing fibers will be arranged so that a greater quantity thereof are disposed circumferentially for increasing the strength of the laminate in that one direction.

Briefly, the apparatus of the present invention will dispense a band of saturated fibers in a desired number for use in a particular application by pulling the fibers through a saturator which may be in the form of a resin bath or the fibers could be sprayed with resin as they are pulled through the apparatus.

Another object of the present invention is to provide a method of producing a plastic laminate substantially stronger than present methods permit without the use of any additional material. At present, there are generally two types of reinforcements used in forming plastic laminate. One type of reinforcement is in the form of a mat made out of short lengths of chopped fibers arranged in a random pattern. The other method is to provide woven fabrics and neither of these methods utilize the relatively high tensile strength of glass fiber to its fullest extent. In the mat construction, the fibers are short and cannot pick up strains or stresses in tension. In woven fabrics, the fiber is continuous but not straight and when tension is applied to the fibers, the fibers have a tendency to straighten out which will flake off the resin and thus the laminate will fail before the stress is picked up by the fiber. It is well known that fibers in fabrics have kinks or curves in them produced by the weaving process and if stress is applied they straighten out and flake the resin off of the fibers. Mat fibers are too short and not arranged to pick up high stresses. A further short coming with these materials is the fact that the directional strength cannot be changed. For example, if a piece of plastic laminate is subject to more stress in one direction than the other, it should have more fibers in that direction and if such a piece of plastic laminate would be constructed from fabrics, it would have a considerable wastage of fiber in the low stress direction which would not have any function whatsoever.

There are actually two main features to the present invention, that is, to produce a saturated band of fibers and place them on a mold surface and to produce an unwoven band of fibers held together with saturated and cured strands of fiber so that it may be placed on a mold surface and saturated in place. While the superior strength of a straight continuous strand in a plastic laminate has been recognized, the present invention provides a process and apparatus to produce such a plastic laminate in an economical manner throughout a wide range of shapes.

These, together with other objects and advantages, which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic side view of the components of the present invention which actually form the saturated band;

FIGURE 2 is a schematic view of the novel fiber chopper taken substantially upon a plane passing along section line 2—2 of FIGURE 1;

FIGURE 3 is a schematic side elevational view of the over-all arrangement of the apparatus illustrating how the components are arranged on carriages and rails to provide for placing the saturated band onto a mold surface;

FIGURE 4 illustrates a portion of the apparatus illustrating the saturated band being placed on a curved mold surface;

FIGURE 5 is a view similar to FIGURE 4 but illustrating the saturated band being placed on a curved or cylindrical mold surface;

FIGURE 6 is an end view illustrating the fiber being placed on the side of a rectangular tube;

FIGURE 7 is a detailed sectional view illustrating the construction of the saturator;

FIGURE 8 is a schematic side elevational view of the apparatus for joining a band of long fibers together so that they can be placed on a mold surface;

FIGURE 9 is a top plan view of the apparatus shown in FIGURE 8;

FIGURE 10 is a schematic side elevational view of an apparatus to join a band of short fibers arranged crosswise to the length of the band so they can be placed on a mold surface;

FIGURE 11 is a top plan view of the construction of FIGURE 10;

FIGURE 12 shows a section of band produced by the apparatus of FIGURE 1;

FIGURE 12a is an end view of the band shown in FIGURE 12;

FIGURE 13 is a plan view of a sheet formed by a number of bands such as illustrated in FIGURE 12;

FIGURE 13a is an end view of a sheet of FIGURE 13;

FIGURE 14 is an elevational view of a cylinder formed by a continuous band formed helically into a cylinder;

FIGURE 14a is an end view of the construction of FIGURE 14; and

FIGURE 15 is a detailed sectional view taken substantially upon a plane passing along section line 15—15 of FIGURE 14a illustrating the orientation of the band as it is formed helically.

Referring now specifically to the drawings and particularly to FIGURES 1 and 2, the saturated fiber band is designated by the numeral 10 and may be considered a product of the structure shown in FIGURES 1 and 2. There is provided a battery of spools designated by the numeral 12 which supply individual fibers 14 which are joined into a band by guide rollers and comb assemblies 16. Two separate bands are formed and come together at the point illustrated and then pass through the saturator generally designated by the numeral 18 for subsequent positioning on a mold surface.

In addition to dispensing one or more bands made up of parallel fibers 14, the machine also is provided with fiber choppers 20 and 22 that place a layer of short fibers in between the two bands. Chopper 22 is a common roving chopper of a kind used to produce a mat. Fiber is fed to chopper 22 from a supply spool 24 and this chopper throws out a supply of fibers of short lengths arranged in a random pattern. The thickness of this layer designated by the numeral 26 may be regulated by increasing or decreasing the speed of the chopper 22 in relation to the movement of the fiber bands 28 and 30 formed by the guide roller and comb assemblies 16.

Chopper 20 is an apparatus for placing a layer of cross fibers 32 in between the bands 28 and 30 so that the cross fibers may be arranged in any desired direction, length and density. It is pointed out that the choppers 20 and 22 may be operated separately or together or all of the choppers may be stopped or additional choppers may be installed to produce the desired properties in the laminate. Chopper 20 is illustrated in detail in FIGURE 2 and includes a mechanism 34 for moving the clamp mechanism 36 in a reciprocatory manner by virtue of a rod 38 interconnecting the operating mechanism 34 and the clamping mechanism 36. The clamping mechanism 36 reciprocates substantially the full width of the band 30 or from position A to position B and the clamp 36 starts out from position A by grasping the fiber 40 supplied by spool 24 and then travels to position B pulling the fiber 40 out. At the instance clamping mechanism 36 reaches position B, simultaneously the fiber is released by clamp 36 and a cutter 42 cuts the fiber so that the piece of fiber 32 then falls in place onto the bottom band of lengthwise fibers 30. The density of the layer produced by the chopper 20 can be regulated by increasing or decreasing the speed of the chopper in relation to the bands 28 and 30 thus producing a plastic laminate that may be extremely versatile as to its mechanical or physical properties. By changing the flow of components, changes may be made in the structure of the laminate. These adjustments can be made while the machine is operating, resulting in uniform and gradual change in the thickness or other properties. This feature is quite important in order not to have abrupt changes in thickness that will cause strain concentrations which, of course, cause the product to fail.

The saturator 18 could be a conventional dip bath where the liquid resin is contained and the fibers are pulled through to be saturated. However, for faster production, a novel saturator illustrated in FIGURE 7 has been provided. In this saturator, liquid resin 44 is forced through the band of fibers instead of letting it soak in. This feature speeds up the operation and completely removes the entrapped air from the fibers and the end result is a void-free laminate. The resin 44 is taken from a tank or bath 46 by a pump 48 through the duct 50. A gear pump is illustrated at 48 but other types of means to move the resin may be employed. The resin 44 is discharged through the duct 52 and is discharged through an opening 54 in the main body 56 of the saturator. The resin is forced through the composite band of fibers 58 as they move in the direction shown by the arrows and the excess resin 44 and forced out air returns through duct 60 to the resin tank 46. A screen 62 is provided in the tank 46 to filter the resin and remove lint that would clog the machine and pump. Of course, the screen may be cleaned at intervals for removing any deposits thereon.

The duct 60 is attached to a cap 64 having a plurality of rollers 66 journaled thereon that guide the band 58 and support the band 58 against the pressure of the resin. Also, rollers 68 are provided, one on the cap 64 and one on the body 56 which act as sizing means to remove excess resin and maintain uniform resin contents. Gate members 70 retain any resin which leaks out from the pressure chamber and prevents such excess resin from escaping and a plurality of ducts 72 in the form of drainage ducts provide drainage for excess resin from the body 56 and return it to the bath or tank 46.

As illustrated in FIGURE 3, the band forming and saturating mechanism and also the mold surface is arranged on a carriage and rails to provide motion in relation to each other in all directions. Referring specifically to FIGURE 3, a carriage generally designated by the numeral 74 is illustrated which includes transverse tracks 76 and wheels or rollers 78 mounted on a supporting platform or frame 80 which supports the saturator 18 and the band forming mechanism which feeds the bands to the saturator 18. The carriage 74 will locate the bands transversely in relation to a mold surface 82 and a carriage generally designated by the numeral 84 provides longitudinal motion to the mold surface for pulling and placing the band 10 on the mold surface 82. The carriage 84 includes longitudinal tracks 86 and rollers 88 mounted on and supporting the mold surface 82.

A clamp 90 illustrated schematically holds the fiber band 10 during the pulling cycle and cutter 92 cuts the band 10 at the end of the cycle. The clamp 90, cutter 92 and the carriage system all may be operated manually or with any suitable mechanical means whereby the necessary motions may be automatically and precisely conducted at predetermined intervals. Further, additional and different carriage and pivoting arrangements may be provided without departing from the scope of the invention for producing a laminate on the mold surface having desired characteristics. By changing the speed and direction of the motion of the carriage system and mold surface in relation to each other, a great variety of laminate with desired properties may be produced.

As illustrated in FIGURES 4, 5 and 6, different mold surfaces may be used. FIGURE 4 illustrates an arrangement to produce a segment of a cylinder in which the mold surface is designated by the numeral 94 and represents the segment of a cylinder which is pivotally mounted on a support pivot point 96 for oscillation about the pivot point 96 whereby the band 10 may be deposited on the mold surface 94 with the cutters 92 operating in the same manner and the saturator 18 also operating in the same manner. In FIGURE 5, the mold surface is in the form of a cylinder and designated by the numeral 98 mounted on a pivot shaft 100 whereby rotation of the mold surface 98 about the shaft 100 will wind the fiber band 10 around the mold surface 98. FIGURE 6 is an arrangement for producing a rectangular tubing on a mold surface 102 such as a hollow beam or the like which is carried on a carriage identical to carriage 84 except for the supporting brackets 104 attached to the carriage 84 for permitting rotation of the tubular beam 102 about its longitudinal axis for applying the plastic laminate to the four sides thereof. The illustration shown in FIGURES 3, 4, 5 and 6 show the fiber band 10 being applied in only one direction. If the cross fiber band 32 is not sufficient to meet the strength requirements in another direction, then additional lengthwise bands can be applied by orientating the mold surface 82 on the carriage 84 to correspond with that direction. To further illustrate this point, for example, if a wall of a tank or pressure vessel is produced where the stress is greatest on the diameter, helical winding of the band is enough since the cross fibers from the choppers provide sufficient strength in a lengthwise direction. However, if an annular member is produced to serve as a beam, more strength is needed lengthwise. In that case, aside from winding the band around the circumference, additional layers of bands are placed lengthwise on the member by rotating the mold surface 90° on the carriage and rail system 84 substantially in the nature of the structure shown in FIGURE 6.

The method and apparatus described above works effectively with substantially any type of fiber and liquid plastic that is hardenable. Most successful operation will result when using a thermo setting plastic such as Polyester or Epoxy and catalyzing the resin to gell and cure when heat is applied after the laminating cycle. In this way, there is no danger of the catalyzed resin gelling in the saturator during continuous operation. In the construction of the saturator, all crevices and corners should be eliminated wherever possible so that the resin is always kept circulating so that a catalyst system to produce curing at room temperature could be used.

FIGURES 8 and 9 illustrate an apparatus generally designated by the numeral 106 to preform a band of long fibers so the band can be handled and placed on a mold surface to be saturated and formed. In this operation, the fibers are taken from the battery spools 108 and guided and formed into a band by a roller and comb assembly 110. A saturating and cutting mechanism generally designated by the numeral 112 places a single strand of fiber 114 saturated in a flexible resin or soluble binder onto the band of fibers designated by the numeral 116. The mechanism 112 is essentially the same as the chopper illustrated in FIGURE 2 except that the strand of fiber 114 is pulled through a saturator 118 prior to cutting. Then the band 116 with the crossed binders 114 in place moves through the belt and drum assemblies 120 and 122. A heating element 124 is provided in the belt and pulley assembly 122 which produces the necessary temperature to cause the resin on the binder strand 114 to cure and the finished assembled fiber band is taken up on a drum 126. Thus, long fibers are formed and arranged and retained on the drum 126 with the fibers orientated by the cross binders 114.

FIGURES 10 and 11 illustrate a modified form of the structure shown in FIGURES 8 and 9 and is constructed to join a band of fibers arranged crosswise. Here, the length of fibers are placed on belt assembly 128 by a chopper 130 which is the same as the chopper shown in FIGURE 2 and single strands of fiber are taken from spools 132 and saturated in the saturator 134 similar to the saturator illustrated in FIGURE 7 and the single strands are then run through drum and belt assemblies 128 and 130 together with the cross fiber. The cross fiber is designated by the numeral 136 while the single fibers are designated by the numeral 138. This forms an integral unit with cross fibers 136 being held in position by the single strand fibers 138 and a heater 140 is provided for curing the resin in the saturated single strand fiber 138 and the finished assembled band is wound up on take-up drum 142. The fiber arrangement produced by the apparatus illustrated in FIGURES 10 and 11 is especially adapted to reinforce seams and joints in members that are under high stress.

FIGURES 12 and 12a illustrate the details of the band 10 produced with the apparatus of FIGURE 1 illustrating the laminated arrangement of the longitudinal fiber bands 28 and 30 and the intermediate fiber band 32.

FIGURES 13 and 13a illustrate a sheet in which a number of bands 10 are employed with the bands 10 being arranged in a staggered overlapping manner as specifically illustrated in FIGURE 13a.

FIGURES 14, 14a and 15 illustrate a cylinder formed by a spirally wound band 10 with the overlapping relationship of the bands 10 when spirally wound being indicated in FIGURE 15. Thus, it will be seen that the basic saturated band produced by the apparatus and the method of the present invention may be employed in many and various different uses.

By altering the relationship of the various components of the present invention, the characteristics of the plastic laminate produced may be varied. For example, the preponderance of fibers may extend either in a longitudinal direction or in a transverse direction or in any angular direction desired. Further, the laminate may be made by superimposing a plurality of layers of saturated bands on a mold surface or an arranged band of fiber may be deposited on the mold surface and then the saturating resin sprayed onto or otherwise deposited onto the fibers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an apparatus for forming an article of manufacture comprising means for supplying tensioned warp strands in a longitudinally extending, substantially flat band, means located adjacent the band for moving a length of weft strand laterally across the band and supporting said weft adjacent thereto, and bonding means for bonding said warp and weft at their points of intersection, the improvement comprising stationary reciprocating means reciprocal in a fixed, straight-line path with respect to a fixed point, for repeatedly placing consecutive, cut substantially parallel weft strands on the warp in a predetermined transverse relationship thereto and means for controllably adjusting the frequency of said reciprocating means by which said weft strands are disposed across said warp, for varying the distance between said weft strands as disposed on said band.

2. An apparatus for producing non-woven plastic reinforcement fabric, said apparatus having a generally horizontally disposed support for fibrous strand material, a source of supply of tensioned parallel fibrous warp strands, means for advancing said warp strands in generally planular, parallel spaced relationship along said support, a source of supply of weft strands, stationary reciprocating-cutting means disposed adjacent said support for periodically placing consecutive lengths of cut substantially parallel weft strands in a generally transverse position on the advancing band formed by said warp strands, said reciprocating means reciprocal in a substantially fixed, straight-line path with respect to a fixed point, said apparatus having bonding resin saturation means downstream of said support with respect to the direction of advance of said warp strands, for saturating said warp and weft strands while disposed in their advancing transverse relationship through said saturation means and curing means downstream of said saturation means for curing said bonding resin, to produce a saturated, non-woven reinforcing fabric for plastic resins.

3. The apparatus of claim 2 wherein said means for periodically placing cut lengths of weft on said band is a stationary reciprocating-cutting arm controllably adjustable as to its rate of reciprocation, independently of the rate of advance of said warp strands, for varying the distance between said weft strands as disposed on said band.

4. An apparatus for producing non-woven plastic reinforcement fabric, said apparatus having a generally horizontally disposed support for fibrous strand material, a source of supply of tensioned parallel warp strands, means for advancing said warp strands in a generally planular, parallel spaced relationship along said support, a bonding resin saturation chamber downstream of said support with respect to the direction of movement of said warp, a source of supply of weft strands, stationary reciprocating-cutting means disposed adjacent said warp strands, as they advance supported by said support, for periodically placing consecutive, cut substantially parallel lengths of said weft strands in generally transverse position on the advancing band formed by said warp strands, said reciprocating means reciprocal in a fixed straight line both in vertical and horizontal planes with respect to a fixed point, said bonding resin saturation chamber for saturating said warp and weft strands while disposed in their advancing transverse relationship, said saturation chamber having means communicating therewith for supplying bonding resin under pressure to said chamber, said pressure chamber having band entry and exit openings, at least two roller supports therewithin spaced apart, journalled substantially transverse to the axis of said warp strands, and in tangentially contacting relationship with said advancing warp and weft strands while in their transverse relationship, said roller supports journalled to present their respective peripheral points of contact to said warp and weft strands in such a manner that said points of contact form substantially a straight line, said chamber having circulatory pumping means for continuously circulating and flushing said bonding resin into said chamber and past said advancing warp and weft, said rollers and the point of entry of said bonding resin into said chamber in such juxtaposition to have said band pass between them via said band entry and exit, at least one each of two of said rollers, respectively, forming part of said chamber band entry and exit, opposed roller means downstream of said saturation chamber for receiving said advancing warp and weft strands therebetween and squeezing the excess of said resin from said warp and weft strands, and curing means downstream of said saturation means for curing said bonding resins for producing a saturated, nonwoven reinforcing fabric for plastic resins.

5. The apparatus of claim 4 wherein the rate of reciprocation of said reciprocating-cutting means for periodically placing cut lengths of weft on said band is controllably adjustable, independently of the rate of advance of said warp, for varying of the distance between said weft strands as disposed on said band.

6. The apparatus of claim 4 wherein the rate of reciprocation of said reciprocating means for periodically placing cut lengths of weft on said band is stationary and controllably adjustable, independently of the rate of advance of said weft, for varying the distance between said weft strands as disposed on said warp, said reciprocating means comprising an arm disposed to move reciprocally above said weft strands in substantially a fixed straight-line path with respect to a fixed point, in a direction transverse to said warp, a substantially continuous supply of tensioned weft strand for supplying weft to said means, said arm having a clamp at one end thereof for grasping an end of said weft adjacent one side of said band and pulling same transversely to span said band, cutting means situated adjacent the side of said band from which said weft was pulled by said clamp, for cutting said weft after it has spanned said band, means for releasing said clamp following cutting of said weft, said arm adaptable to thereafter return reciprocally in the opposite direction back across said band for again grasping an end of said weft for repetition of the foregoing cycle.

References Cited in the file of this patent

UNITED STATES PATENTS

| | | |
|---|---|---|
| 2,207,279 | Alderfer | July 9, 1940 |
| 2,415,028 | Bosomworth et al. | Jan. 28, 1947 |
| 2,552,124 | Tallman | May 8, 1951 |
| 2,682,491 | Hahn | June 29, 1954 |
| 2,704,734 | Draper et al. | Mar. 22, 1955 |
| 2,742,931 | De Ganahl | Apr. 24, 1956 |
| 2,931,421 | Schuller | Apr. 5, 1960 |
| 2,936,022 | Stevenson | May 10, 1960 |
| 3,029,179 | Wilson et al. | Apr. 10, 1962 |
| 3,041,230 | Diehl | June 26, 1962 |
| 3,042,569 | Paul | July 3, 1962 |
| 3,108,028 | Sprunck et al. | Oct. 22, 1963 |

FOREIGN PATENTS

| | | |
|---|---|---|
| 440,191 | Great Britain | Dec. 16, 1935 |

OTHER REFERENCES

Sonneborn: Fiberglass Reinforced Plastics, 1st Ed., 1954, Reinhold Publishing Corp., p. 77 relied on.